United States Patent
Mattellini et al.

(10) Patent No.: US 6,944,434 B2
(45) Date of Patent: Sep. 13, 2005

(54) METHOD AND APPARATUS FOR SUPPRESSING CO-CHANNEL INTERFERENCE IN A RECEIVER

(75) Inventors: Gian Paolo Mattellini, Helsinki (FI); Kiran Kuchi, Irving, TX (US); Pekka A. Ranta, Nummela (FI)

(73) Assignee: Nokia Corporation, Espoo (FI)

( * ) Notice: Subject to any disclaimer, the term of this patent is extended or adjusted under 35 U.S.C. 154(b) by 83 days.

(21) Appl. No.: 10/608,860

(22) Filed: Jun. 27, 2003

(65) Prior Publication Data

US 2004/0266383 A1 Dec. 30, 2004

(51) Int. Cl.$^7$ ................................................ H04B 1/10
(52) U.S. Cl. ...................... 455/296; 455/307; 455/63.1; 455/67.13; 375/346; 375/348; 375/148
(58) Field of Search .......................... 455/63.1, 67.13, 455/296, 303–307, 309, 312, 313; 375/346–351, 148; 370/347, 442

(56) References Cited

U.S. PATENT DOCUMENTS

| | | | | |
|---|---|---|---|---|
| 5,287,556 A | * | 2/1994 | Cahill | 455/266 |
| 5,875,216 A | * | 2/1999 | Martin | 375/347 |
| 2003/0063596 A1 | | 4/2003 | Arslan et al. | 370/347 |
| 2004/0170234 A1 | * | 9/2004 | Pukkila et al. | 375/340 |

FOREIGN PATENT DOCUMENTS

WO   WO 01/93439 A1   12/2001   ............ H04B/1/10

OTHER PUBLICATIONS

Baccarelli et al, "Minimum–error–probability single–user detection for ISI–impaired narrow–band multiuser systems", IEEE trans. on communications, vol. 49, No. 6, Jun. 2001.*

* cited by examiner

Primary Examiner—Duc M. Nguyen
(74) Attorney, Agent, or Firm—Ware, Fressola, Van Der Sluys & Adolphson LLP

(57) ABSTRACT

A method of operation of a filter (12) of a receiver (10) of a mobile station or a base station of a radio access network and corresponding equipment, the method for use in suppressing co-channel interference and based on separating the in-phase (I) and quadrature phase (Q) components of the received signal and then performing whitening on a symbol-by-symbol basis, i.e. the whitening operation is done within one symbol. The invention provides a filter (12) including a module (12b) for performing IQ whitening (either according to the invention or otherwise), and also provides a switch (12a) that can be used to enable or disable IQ whitening, depending on the character of the received signal, and in particular based on the noise plus interference correlation matrix ($\hat{R}_{ii}$)

13 Claims, 2 Drawing Sheets

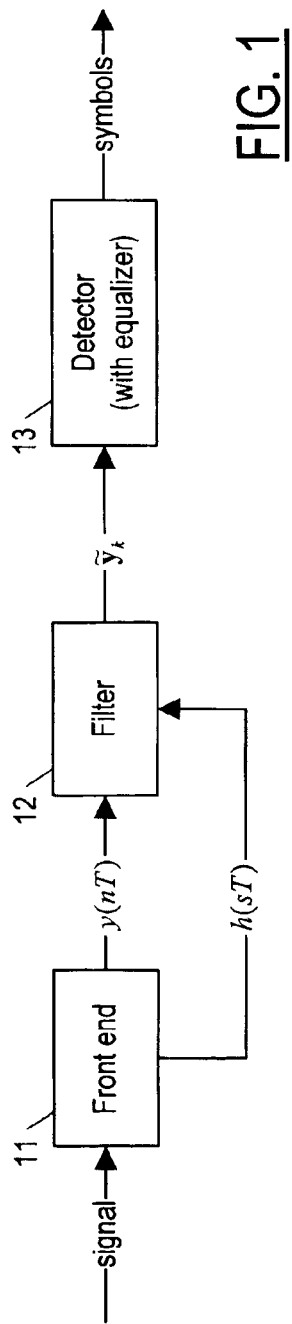
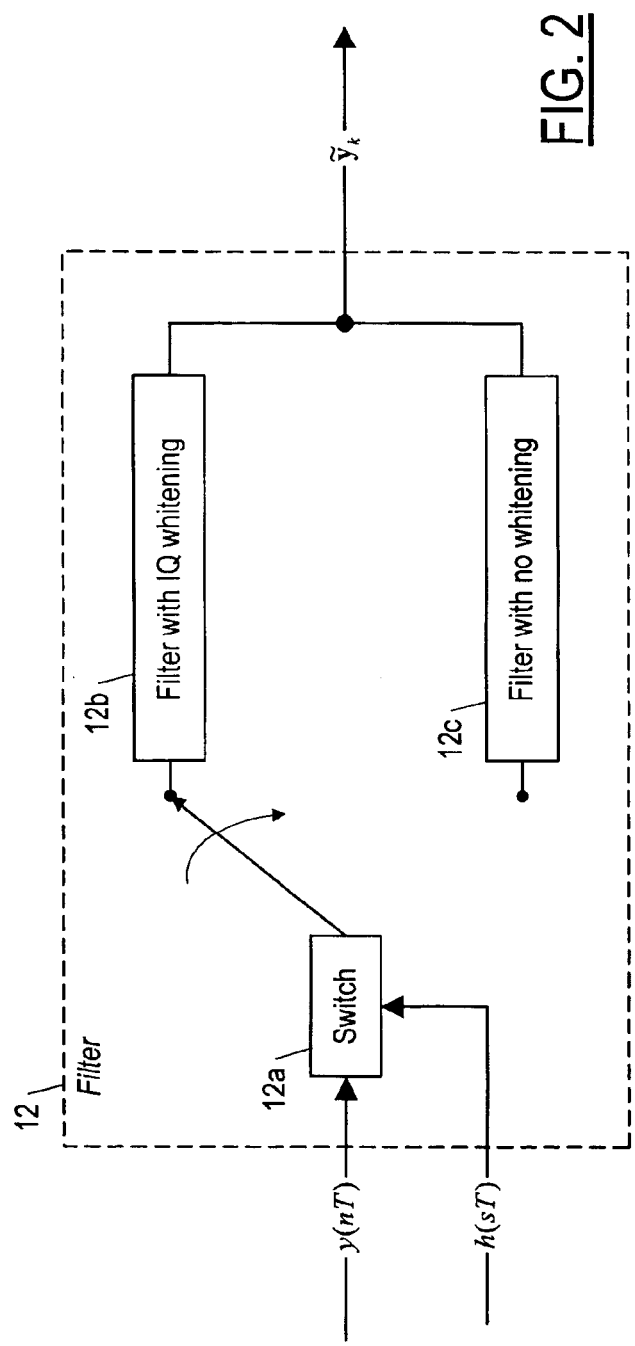

METHOD AND APPARATUS FOR SUPPRESSING CO-CHANNEL INTERFERENCE IN A RECEIVER

TECHNICAL FIELD

The present invention pertains to the field of receivers for digital communications. More particularly, the present invention pertains to canceling interference in such receivers, including for example digital receivers in cellular telephones.

BACKGROUND ART

It is well known that one of the major limitations in cellular and other wireless telephone networks is so-called co-channel interference. In the case of time division multiple access (TDMA) networks, such as GSM (Global System for Mobile Communications)/GPRS (General Packet Radio Service)/EDGE (Enhanced Data Rates For GSM Evolution), co-channel interference is caused mainly by what is termed frequency reuse, i.e. the same frequencies in the allocated spectrum are used in different cells, and so, depending on the reuse factor, a signal received by a cellular phone will contain not only a desired forward channel for a current cell, but also channels originating in other cells.

The prior art for co-channel interference suppression includes: "A Receiver," having International Publication Number WO 01/93439, with priority date of 31 May 2000, by inventors Ottersten, Kristensson, and Astely; and also "Methods and Apparatus for canceling co-channel interference in a receiving system using spatio-temporal whitening," having U.S. patent application Pub. No. US 2003/0063596, with a priority date of Sep. 19, 2001, by inventors Huseyin Arslan and Ali S. Khayrallah. The receiver disclosed in WO 01/93439 is based on the well-known fact that if (co-channel) interference is considered to be colored noise and the noise is whitened, signal gain can be achieved. The novelty of WO 01/93439 is asserted to be a filter providing efficient whitening by exploiting the additional degree of freedom that arises from the separation of the real and imaginary components of the received signal, i.e. of the in-phase and quadrature-phase components. The teachings of US 2003/0063596 are similar to WO 01/93439 in respect to suppressing co-channel interference.

In WO 01/93439 the interference is modeled as an IIR (infinite impulse response) process with order K, and (consequently) the whitening operation is performed by a (multidimensional) FIR (finite impulse response) filter with K (or K+1) filter taps. After the whitening operation, the impulse response of the wanted signal is of course modified; in particular, because of the convolution with the whitening filter, the whitening operation of WO 01/93439 suffers from what is here called "the increased channel length problem," i.e. the impulse response of the wanted signal becomes longer, requiring a more complex equalizer or at least a modified equalizer including some mechanism to take into account the increased channel length (otherwise the receiver incurs a performance loss). The increased channel length problem requires that the equalizer of a receiver be modified if the whitening operation per WO 01/93439 is to be implemented by the receiver.

Additionally the achievable performance gain obtainable using the whitening operation of WO 01/93439 depends on the model parameter K indicating the number of taps of the FIR filter. In general the higher the K, the higher the gain, but if K exceed a certain threshold (which depends on the particular interference being suppressed and so is in principle not a priori known) the problem of finding the FIR filter coefficients becomes ill-conditioned, i.e. the FIR filter can not be found.

What is therefore needed is a more robust, less complex method of suppressing co-channel interference based on noise whitening, one that is easier to integrate into existing receivers, such a GSM (Global System for Mobile Communications)/EDGE (Enhanced Data Rates for GSM Evolution) receivers.

DISCLOSURE OF THE INVENTION

Accordingly, in a first aspect of the invention, a method is provided for use by a receiver of a wireless communication system in receiving over a communication channel a radio transmission of a number of symbols each having an in-phase and a quadrature component, the method including a step of receiving and sampling the radio transmission so as to provide a succession of samples, and also a step of filtering the succession of samples, the method characterized in that: the step of filtering the succession of samples includes a step of whitening the samples on a sample-by-sample basis by evaluating, for each sample in the succession of samples, a noise plus interference correlation matrix including information about the correlation of both the in-phase and quadrature phase components of the sample.

In accord with the first aspect of the invention, the step of filtering may be further characterized by: a step of switching on or off the step of whitening the samples, with the switching based on determining whether the communication channel is sensitivity-limited so that noise is present that can be characterized as substantially white.

Also in accord with the first aspect of the invention, whether the communication channel is determined to be sensitivity-limited may be based on a calculated value of a metric and a corresponding predetermined threshold. Further, the metric may be based on relative values of different components of the noise plus interference correlation matrix. Also further, the switching may be based on comparing the value of a metric defined by $$M_{ii} = \frac{R_{1ii}}{R_{0ii}}$$

where $R_{0ii}=E|i_k{}^*i_k|$ and $R_{1ii}=E|i_k{}^*i_{k+1}|$. Still also further, the switching may be based on examining second order or higher order statistic of the noise plus interference signal related to the noise plus interference correlation matrix.

Also in accord with the first aspect of the invention, the method may be further characterized in that the noise plus interference correlation matrix is determined using:

$$\tilde{R}_{ii} = E[i_k \tilde{i}_k^t],$$

where $i_k$ is a noise plus interference signal. Further, the method may be further characterized in that each vector $Y_k$ representing one symbol is whitened using:

$$\tilde{y}_k = W y_k$$

where W is defined as the inverse of a square root operation on the noise plus interference correlation matrix $\tilde{R}_{ii}$, so that:

$$W = \tilde{R}_{ii}^{-1/2}.$$

Also in accord with the first aspect of the invention, each symbol may be indicated by one or more samples, including samples from possibly different antennas.

A second aspect of the invention provides a receiver used as part of or with a wireless communication system, characterized in that it comprises means for performing the steps of a method according to the first aspect of the invention. Further, the receiver may be part of a mobile station. Also further, the receiver may be part of a base station of a radio access network of the wireless communication system.

A third aspect of the invention provides a system comprising a mobile station and a base station used as part of or with a wireless communication system, each including a receiver, characterized in that at least one of the receivers comprises means for performing the steps of a method according to the first aspect of the invention.

One of the problems that the present invention solves is that it does not cause the increased channel length problem, i.e. the number of channel taps before and after the IQ whitening filter are the same.

BRIEF DESCRIPTION OF THE DRAWINGS

The above and other objects, features and advantages of the invention will become apparent from a consideration of the subsequent detailed description presented in connection with accompanying drawings, in which:

FIG. 1 is a block diagram/flow diagram of components of a receiver including a filter of a type in which the present invention can be used.

FIG. 2 is a block diagram/flow diagram showing the filter of FIG. 1 in more detail, and in particular showing a module for performing IQ whitening.

BEST MODE FOR CARRYING OUT THE INVENTION

Figure 3:
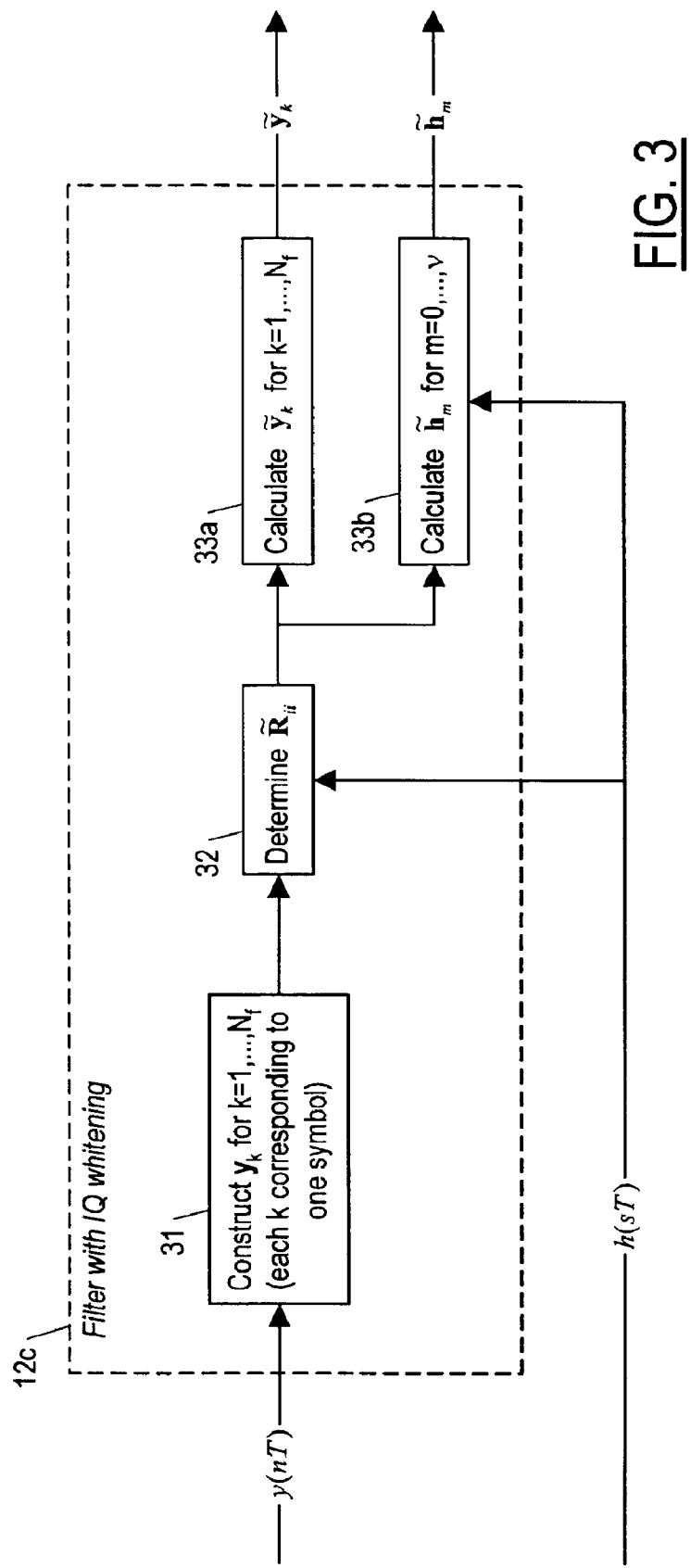
FIG. 3 is a block diagram/flow diagram of the IQ whitening filter module of FIG. 2.

The invention provides a way to suppress co-channel interference in a receiver of a wireless communication system by use of a novel so-called IQ whitening operation and a novel way of modeling the interference. In particular, the whitening operation is done within one symbol. It is not possible to do whitening within one symbol using the procedure set out in the above-mentioned WO 01/93439 because doing so would mean setting the model parameter K (indicating the number of taps of the FIR filter) equal to zero, resulting in the FIR filter becoming an identity matrix, which does not provide any whitening.

In addition, the inventors have observed that whitening an interfering signal (to suppress the interference) causes performance loss when the interference (or noise) is already substantially white, i.e. before the whitening operation. To avoid causing such a performance loss, the invention includes a switching on or off whitening depending on how white the interfering signal is.

In the description below, it is assumed that a receiver in which the invention is implemented operates with two samples per symbol. This is the preferred implementation, but the invention is also applicable in case of any number of input samples per symbol. The number of samples per symbol can be increased also by means of interpolation if additional samples are not available directly from the A/D (analog to digital) converter in the front end of the receiver. Also, the description below assumes a single antenna receiver, and this is the situation in which the invention is most useful; however the invention can be easily extended to more than one receiver antenna, and the samples received from different antennas can be treated equivalently as fractional samples. For example, the algorithm would be the same if two samples per symbol are available from a single antenna or if one sample per symbol is available from two antennas. Also, still, although the invention is described in respect to binary PAM (Pulse Amplitude Modulation), so that the symbols x are restricted to the interval (−1,1), i.e. $x_{k,i} \in (-1,1)$, as is clear from the discussion that follows, nothing about the invention so restricts it and the invention has potential application in system in which any kind of binary modulation or multi level PAM (pulse amplitude modulation) is employed, including e.g. BPSK (binary phase shift keying), MSK (minimum shift keying). Of course the invention is also applicable for offset-QAM modulations like binary offset QAM and quaternary-offset QAM as they can be viewed as binary or quaternary PAM signal by applying a proper rotation every symbol. In particular, the invention is suitable for GMSK (Gaussian minimum shift keying) modulation used e.g. in GSM and Bluetooth, as it is well known that GMSK can be closely approximated by binary modulation.

Referring now to FIG. 1, a receiver is shown of a type in which the present invention can be implemented, including: a front end 11 having one or more antennas and tuning equipment for receiving a signal on a selected communication channel and sampling the signal so as to provide a sampled received signal y(nT) where T stands for the time between (transmission of) successive symbols (i.e. the inverse of the symbol rate), and n=k+q/l where k is the index that runs for all the transmitted symbols, q is the oversampling index that runs from 0 to l, and l is the oversampling factor, i.e. the number of samples per symbol,(or the number of receiver antennas or the oversampling factor×number of receiver antennas); a filter 12 according to the invention for filtering the sampled received signal to remove co-channel interference and noise so as to produce a filtered sampled signal $\tilde{y}_k$ (i.e. a succession of filtered signal samples); and a detector 13 for determining symbols x corresponding to the filtered signal samples $\tilde{y}_k$ (i.e. each symbol x corresponding to one or more samples of the received signal).

What is indicated in FIG. 1 as the front end 11 represents many different functionalities necessary for receiver operation, functionalities separable from those provided by the invention, such as e.g. means for channel estimation, means for frequency offset estimation, means for DC offset compensation, means for signal de-rotation (in case it is needed such as for example for GMSK modulation). Basically, as indicated in FIG. 1, the front end 11 gives as output baseband samples y(nT) of the received signal and the estimated discrete channel impulse response h(sT), where s=m+q/l and m runs from 0 to v with $0 \leq m \leq v$ and v equal to one less than the channel impulse response length.

Referring now to FIG. 2, the filter 12 according to the invention includes a module 12c for performing IQ whitening, but since, as mentioned above, it is not always advantageous to perform IQ whitening, in a preferred embodiment of the filter 12, a switch module 12a is included for switching between one of two filtering modules 12b–c depending on a comparison of predetermined thresholds with metrics calculated by the switch module 12a, as explained in more detail below. The switch module 12a switches between either a filter module 12b that performs IQ whitening (either according to the invention or according to the prior art), or a filter module 12c that performs no whitening.

First the invention with respect to the IQ filtering module 12c is described, and then the invention with respect to the switch 12a is described.

In the description that follows, we assume over-sampling by an over-sampling factor of l=2 and we write the received signal samples $y_k$ at the output of block 11 in terms of the channel data input $x_k$ and the sampled channel impulse response $h_m$ as:

$$y_k = \sum_{m=0}^{v} h_m^{(0)} x_{k-m}^{(0)} + \sum_{j=1}^{J} \sum_{m=0}^{v} h_m^{(j)} x_{k-m}^{(j)} + n_k, \quad (1)$$

where $0 \leq m \leq v$ and v is equal to one less than the channel impulse response length. The superscript j denotes the indexing for each signal on the selected communication channel, with j=0 indicating the desired signal and the other j values indicates co-channel interference, and with $$y_k = \begin{bmatrix} \mathrm{Re}(y(kT)) \\ \mathrm{Im}(y(kT)) \\ \mathrm{Re}\left(y\left(\left(k+\frac{(l-1)}{l}\right)T\right)\right) \\ \mathrm{Im}\left(y\left(\left(k+\frac{(l-1)}{l}\right)T\right)\right) \end{bmatrix},$$

$$h_m^{(j)} = \begin{bmatrix} \mathrm{Re}(h^{(j)}(mT)) \\ \mathrm{Im}(h^{(j)}(mT)) \\ \mathrm{Re}\left(h^{(j)}\left(\left(m+\frac{(l-1)}{l}\right)T\right)\right) \\ \mathrm{Im}\left(h^{(j)}\left(\left(m+\frac{(l-1)}{l}\right)T\right)\right) \end{bmatrix}, \text{ and }$$

$$n_k = \begin{bmatrix} \mathrm{Re}(n(kT)) \\ \mathrm{Im}(n(kT)) \\ \mathrm{Re}\left(n\left(\left(k+\frac{(l-1)}{l}\right)T\right)\right) \\ \mathrm{Im}\left(n\left(\left(k+\frac{(l-1)}{l}\right)T\right)\right) \end{bmatrix},$$

and using T for the time between (transmission of) successive symbols. We can define a block of $N_f$ received samples as:

$$\begin{bmatrix} y_{k+N_f-1} \\ y_{k+N_f-2} \\ \vdots \\ y_k \end{bmatrix} =$$

$$\sum_{j=0}^{M} \begin{bmatrix} h_0^{(j)} & h_1^{(j)} & \cdots & h_v^{(j)} & 0 & \cdots & 0 \\ 0 & h_0^{(j)} & h_1^{(j)} & \cdots & h_v^{(j)} & 0 & \cdots \\ \vdots & & & & & & \vdots \\ 0 & \cdots & 0 & h_0^{(j)} & h_1^{(j)} & \cdots & h_v^{(j)} \end{bmatrix} \begin{bmatrix} x_{k+N_f-1}^{(j)} \\ x_{k+N_f-2}^{(j)} \\ \vdots \\ x_{k-v}^{(j)} \end{bmatrix} + \begin{bmatrix} n_{k+N_f-1} \\ n_{k+N_f-2} \\ \vdots \\ n_k \end{bmatrix}$$

or more compactly, as:

$$y_{k+N_f-1:k} = H_0 x_{k+N_f-1:k-v}^{(0)} + \sum_{j=1}^{M} H_j x_{k+N_f-1:k-v}^{(j)} + n_{k+N_f-1:k}, \quad (2)$$

which includes the desired signal $H_0 x_{k+N_f-1:k-v}^{(0)}$ and the noise plus (co-channel) interference signal $$\sum_{j=1}^{M} H_j x_{k+N_f-1:k-v}^{(j)} + n_{k+N_f-1:k}.$$

For convenience, we define the noise plus interference signal $i_k$ at the instant corresponding to index (sample counter) k as the 4×1 vector:

$$i_k = \begin{bmatrix} \mathrm{Re}\{i[kT]\} \\ \mathrm{Im}\{i[kT]\} \\ \mathrm{Re}\left\{i\left[\left(k+\frac{(l-1)}{l}\right)T\right]\right\} \\ \mathrm{Im}\left\{i\left[\left(k+\frac{(l-1)}{l}\right)T\right]\right\} \end{bmatrix} \quad (3)$$

$$= \sum_{j=1}^{M} \begin{bmatrix} h_0^{(j)} & h_1^{(j)} & \cdots & h_v^{(j)} \end{bmatrix} \cdot \begin{bmatrix} x_k^{(j)} \\ x_{k-1}^{(j)} \\ \vdots \\ x_{k-v}^{(j)} \end{bmatrix} + n_k.$$

Next, we define a filter operation $L^{-1}$ so as to provide the whitened received signal samples $\tilde{y}$ as follows:

$$\tilde{y}_{k+N_f-1:k} = L^{-1} y_{k+N_f-1:k}, \quad (4)$$

where, according to the invention, $$L^{-1} = \begin{bmatrix} \tilde{R}_{ii}^{\frac{-1}{2}} & 0 & \cdots & 0 \\ 0 & \tilde{R}_{ii}^{\frac{-1}{2}} & 0 & \vdots \\ \vdots & \vdots & \vdots & \\ 0 & \cdots & 0 & \tilde{R}_{ii}^{\frac{-1}{2}} \end{bmatrix} \quad (5)$$

in which $\tilde{R}_{ii}$ is the 4×4 noise plus interference correlation matrix given by:

$$\tilde{R}_{ii} = E[i_k i_k^*], \quad (6)$$

in which E[ . . .] is the mathematical operation of taking the ensemble average. Since the interference arises from a cyclo stationary random process, the expectation operation can be replaced by a time average, i.e.

$$\tilde{R}_{ii} = \sum_k [i_k i_k^*]. \quad (6.1)$$

Thus, each 4×1 vector $\tilde{y}_k$ representing one symbol can be whitened as $$\tilde{y}_k = W y_k \quad (7)$$

where W is defined as the inverse of a square root operation on a positive definite Hermitian matrix $\tilde{R}_{ii}$, i.e.

$$W = \tilde{R}_{ii}^{-1/2}. \quad (7.1)$$

In the preferred embodiment, the Hermitian matrix $\tilde{R}_{ii}$ is the noise plus interference correlation matrix, and the whitening matrix $W = \tilde{R}_{ii}^{-1/2}$ is obtained in the preferred embodiment as the inverse of a Choleski factorization of $\tilde{R}_{ii}$. Alternatively the whitening matrix W can be obtained by any factorization of $\tilde{R}_{ii}$, i.e. any factorization indicated by, $$(WW')^{-1} = \tilde{R}_{ii}, \tag{7.2}$$

or be obtained by any factorization of $\tilde{R}_{ii}$, as indicated by, $$U\lambda V' = \tilde{R}_{ii},$$

such as for example by Singular Value Decomposition (SVD). In such a case, the whitening matrix W can be obtained as $W = V\lambda^{-1/2}$.

According to the invention, a whitened impulse response $\tilde{H}_0$ is also provided by the filter 12, this time acting on the impulse response $H_0$:

$$\tilde{H}_0 = L^{-1} H_0 = \begin{bmatrix} \tilde{h}_0^{(0)} & \tilde{h}_1^{(0)} & \cdots & \tilde{h}_v^{(0)} & 0 & \cdots & 0 \\ 0 & \tilde{h}_0^{(0)} & \tilde{h}_1^{(0)} & \cdots & \tilde{h}_v^{(0)} & 0 & \cdots \\ \vdots & & & & & & \vdots \\ 0 & \cdots & 0 & \tilde{h}_0^{(0)} & \tilde{h}_1^{(0)} & \cdots & \tilde{h}_v^{(0)} \end{bmatrix}, \tag{8}$$

Therefore, each 4×1 vector $\tilde{h}_m$ may be computed as:

$$\tilde{h}_m^{(0)} = W h_m^{(0)} \tag{9}$$

for $0 \leq m \leq v$. So, it is clear that the interference suppression method disclosed by the present invention does not cause the problem of increased channel length, i.e. it is clear from eq. (9) that $\tilde{h}_m$ has the same dimension as $h_m$.

Referring now to FIG. 3, the filter module 12c (FIG. 2) according to the invention preferably includes: a first module 31 for constructing the succession of samples $y_k$ for k=1, . . . , $N_f$, with each k corresponding to one symbol; a next module 32 for determining the noise plus interference correlation matrix $\tilde{R}_{ii}$; and a third module 33 for calculating the filtered, whitened samples $\tilde{y}_k = W y_k$ for k=1, . . . , $N_f$.

Referring still to FIG. 3, in some embodiments the filter 12 can include an additional module following the module 33 for calculating $\tilde{y}_k = W y_k$. Such a module would not decimate the signal in case of a fractionally spaced equalizer, but in case of a symbol-spaced equalizer, the module would decimate the signal, and would do so by filtering the signal with a filter equivalent to the feed-forward filter of a DFE equalizer or by a polyphase matched filter.

In the preferred embodiment the detector 13 is a trellis detector, and the input of the trellis detector is symbol spaced. This symbol spaced input can be obtained by post processing the output of the whitening filter W by a pre-filter (designed for white noise) equivalent to the feed forward filter of a Decision Feedback Equalizer (DFE). By approximating the noise plus interference correlation matrix $\tilde{R}_{ii}$ as in eq. (6), only the correlation within one symbol is removed. Therefore, some residual correlation may be expected, and could be, for instance, taken into account in a subsequent optimization of a feed-forward filter. After such post processing, a Forney metric can be used in the trellis Viterbi equalizer. See e.g. "Unification of MLSE Receivers and Extensions to Time Varying Channels"; by G. Bottomley, S. Chennakesku; in IEEE Trans. Inform. Theory; vol. 46, pp 464–472, April 1998.

Alternatively the equalizer could employ the Ungerboeck metric, also described in the above paper by Bottomley et al. In such a case, there is no need to employ a pre-filter, but the output of the whitening filter W can be decimated to one sample per symbol by employing a polyphase matched filter, matched to the whitening desired impulse response.

Alternatively the equalizer can operate with more than one sample per symbol, and in such a case there is yet another alternative implementation. If the detector can operate with more than one sample per symbol, instead of using a pre-whitening operation, the same result can be obtained by modifying the metric inside the equalizer to take into account the noise correlation. More specifically a modified branch metric given by:

$$\tilde{M}_k = \left( y_k - \sum_{m=0}^{v} h_m^{(0)} x_{k-m}^{(0)} \right)^T \tilde{R}_{ii}^{-1} \left( y_k - \sum_{m=0}^{v} h_m^{(0)} x_{k-m}^{(0)} \right) \tag{10}$$

can be used instead of the Euclidean metric, $$M_k = \left( \tilde{y}_k - \sum_{m=0}^{v} \tilde{h}_m^{(0)} x_{k-m}^{(0)} \right)^T \left( \tilde{y}_k - \sum_{m=0}^{v} \tilde{h}_m^{(0)} x_{k-m}^{(0)} \right), \tag{11}$$

which would be used after the pre-whitening operation.

The invention also provides a mechanism for enabling and disabling IQ whitening (either performed as described above or using other techniques). Such a switching mechanism is useful because, it turns out, IQ whitening to suppress co-channel interference is remarkably effective for binary modulated co-channel interference-limited channels, but causes some performance loss in sensitivity (white noise) limited channels. The invention thus provides a switching algorithm that can be used to dynamically switch between IQ whitening and non-whitening in a receiver. In some embodiments, the switching is based on examining relative values of different components of the noise plus interference correlation matrix $\tilde{R}_{ii}$, as explained below. In some other embodiments, the switching is based on examining expectations $E[\ldots]$ of different products $i_k^* i_k$ and $i_k^* i_{k+1}$, as also explained below. The idea behind the switching mechanism provided by the invention is to determine whether the noise present is white noise (in such case the whitening is turned off), or non white noise, i.e. whether it is temporally correlated (in such case the whitening is turned on).

In the embodiment based on examining relative values of different components of the noise plus interference correlation matrix $\tilde{R}_{ii}$, we detect whether the noise is white as follows. As described above, the IQ whitening filter (with truncated autocorrelation) requires the computation of the 4×4 (2-IQ split, 2-over-sampling) correlation matrix $\tilde{R}_{ii}$ from the noise samples. So in the preferred embodiment, the metric for switching on and off whitening is derived as a function of the elements of $\tilde{R}_{ii}$.

In the case of binary modulated co-channel interferers, it turns out that the temporal correlation (between the fractional samples, i.e. the samples within one symbol) can be expressed as a combination of the elements of the IQ correlation matrix $\tilde{R}_{ii}$, as follows:

$$R_{temporal} = \tilde{R}_{ii}(1,3) + \tilde{R}_{ii}(2,4) + \sqrt{-1} * (\tilde{R}_{ii}(2,3) - \tilde{R}_{ii}(1,4)). \tag{12}$$

Thus for a binary modulated interfering signal, the temporal correlation can be obtained from the elements of the IQ correlation matrix, and the correlation between the real and imaginary components of a sample does not become zero.

The switching provided by the invention according to the embodiment based on examining relative values of different components of the noise plus interference correlation matrix $\tilde{R}_{ii}$ can thus be prescribed as follows. Define $$M_{tc} = 2 \frac{|(\tilde{R}_{ii}(1,3) + \tilde{R}_{ii}(2,4)) + \sqrt{-1} * (\tilde{R}_{ii}(2,3) - \tilde{R}_{ii}(1,4))|^2}{\sum_{k=1}^{2} (\tilde{R}_{ii}(2k, 2k) + \tilde{R}_{ii}(2k-1, 2k-1))^2} \quad (13)$$

as a metric for indicating whether a channel is temporally correlated (i.e. is sensitivity limited so that the noise is white noise). As can be seen, the metric depends on the relative values of different components of the noise plus interference correlation matrix $\tilde{R}_{ii}$. Then, if $M_{tc} > \tau_{tc}$ for some predetermined threshold $\tau_{tc}$, the channel is categorized as temporally correlated and whitening is performed; otherwise whitening is disabled.

As mentioned, in some other embodiments the switching is based on examining expectations $E[\ldots]$ of different products $i_k^* i_k$ and $i_k^* i_{k+1}$. In such embodiments, we evaluate the (numerical) value, $$R_{0ii} = E[i_k^* i_k] \quad (14)$$

and also the (numerical) value, $$R_{1ii} = E[i_k^* i_{k+1}]. \quad (15)$$

Then, using as a metric for determining whether to whiten the quantity $M_{ti}$ defined by:

$$M_{ti} = \frac{R_{1ii}}{R_{0ii}}, \quad (16)$$

we switch to whitening when $M_{ti}$ is greater than some predetermined threshold $\tau_{ti}$ (having a value that can depend on the application).

Both of the embodiments for switching described above are based on observation of the second order statistics of the interference signal. Other embodiments may depend a more complicated measure.

Thus, referring again to FIG. 2, in case of insubstantial temporal correlation (i.e. e.g. in case of $M_{tc} < \tau_{tc}$), the switch 12a switches to the module 12c for filtering without whitening, and otherwise switches to the module 12b for whitening.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method for use by a receiver of a wireless communication system in receiving over a communication channel a radio transmission of a number of symbols each having an in-phase and a quadrature component, the method including a step (11) of receiving and sampling the radio transmission so as to provide a succession of samples, and also a step (12) of filtering the succession of samples, the method characterized in that:

the step (12) of filtering the succession of samples includes a step (12b) of whitening the samples on a sample-by-sample basis by evaluating, for each sample in the succession of samples, a noise plus interference correlation matrix ($\tilde{R}_{ii}$) including information about the correlation of both the in-phase and quadrature phase components of the sample.

2. A method as in claim 1, wherein the step (12) of filtering is further characterized by:

a step (12a) of switching on or off the step (12b) of whitening the samples, with the switching based on determining whether the communication channel is sensitivity-limited so that noise is present that can be characterized as substantially white.

3. A method as in claim 1, wherein whether the communication channel is determined to be sensitivity-limited is based on a calculated value of a metric ($M_{tc}$, $M_{ti}$) and a corresponding predetermined threshold ($\tau_{tc}$, $\tau_{ti}$).

4. A method as in claim 3, wherein the metric ($M_{tc}$) is based on relative values of different components of the noise plus interference correlation matrix ($\tilde{R}_{ii}$).

5. A method as in claim 3, wherein the switching is based on comparing the value of a metric ($M_{ti}$) defined by $$M_{ti} = \frac{R_{1ii}}{R_{0ii}} \text{ where } R_{0ii} = E[i_k^* i_k] \text{ and } R_{1ii} = E[i_k^* i_{k+1}].$$

6. A method as in claim 3, wherein the switching is based on examining a second order or a higher order statistic of the noise plus interference signal ($i_k$) related to the noise plus interference correlation matrix ($\tilde{R}_{ii}$).

7. A method as in claim 1, further characterized in that the noise plus interference correlation matrix ($\tilde{R}_{ii}$) is determined using:

$$\tilde{R}_{ii} = E[i_k i_k^*],$$

where $i_k$ is a noise plus interference signal.

8. A method as in claim 7, further characterized in that each vector $y_k$ representing one symbol is whitened using:

$$\tilde{y}_k = W y_k$$

where W is defined as the inverse of a square root operation on the noise plus interference correlation matrix $\tilde{R}_{ii}$, so that:

$$W = \tilde{R}_{ii}^{-1/2}.$$

9. A method as in claim 1, wherein each symbol is indicated by one or more samples, including samples from possibly different antennas.

10. A receiver used as part of or with a wireless communication system, characterized in that it comprises means (12) for performing the steps (12 12b) recited in claim 1.

11. A receiver as in claim 10, wherein the receiver is part of a mobile station.

12. A receiver as in claim 10, wherein the receiver is part of a base station of a radio access network of the wireless communication system.

13. A system, comprising a mobile station and a base station used as part of or with a wireless communication system, each including a receiver, characterized in that at least one of the receivers comprises means (12) for performing the steps (12 12b) recited in claim 1.

* * * * *

UNITED STATES PATENT AND TRADEMARK OFFICE
CERTIFICATE OF CORRECTION

PATENT NO. : 6,944,434 B2
DATED : September 13, 2005
INVENTOR(S) : Mattellini et al.

It is certified that error appears in the above-identified patent and that said Letters Patent is hereby corrected as shown below:

Column 10,
Line 11, delete "claim 1" and substitute -- claim 2 --.
Lines 18 and 25, delete "claim 3" and substitute -- claim 2 --.

Signed and Sealed this

Twenty-second Day of November, 2005

JON W. DUDAS
*Director of the United States Patent and Trademark Office*